April 13, 1937. E. J. ROGERS, JR 2,077,267
FLIGHT INDICATOR FOR AIRCRAFT
Filed Oct. 1, 1935 2 Sheets-Sheet 2
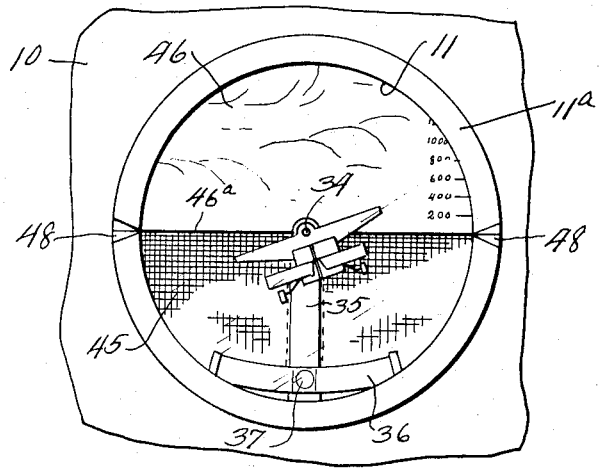
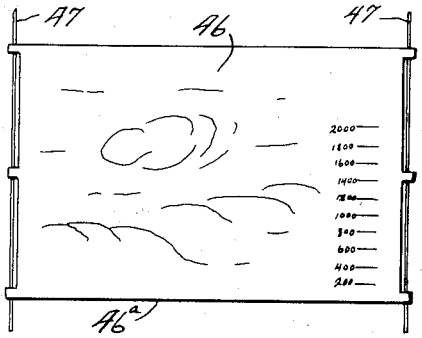
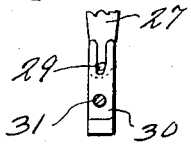
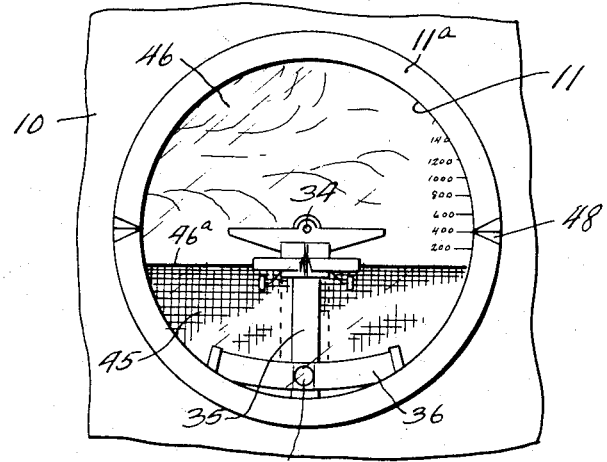
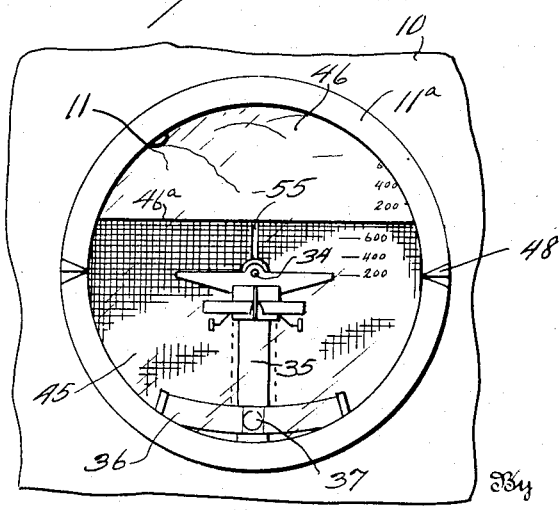
Inventor
E. J. Rogers, Jr.
By Watson E. Coleman
Attorney

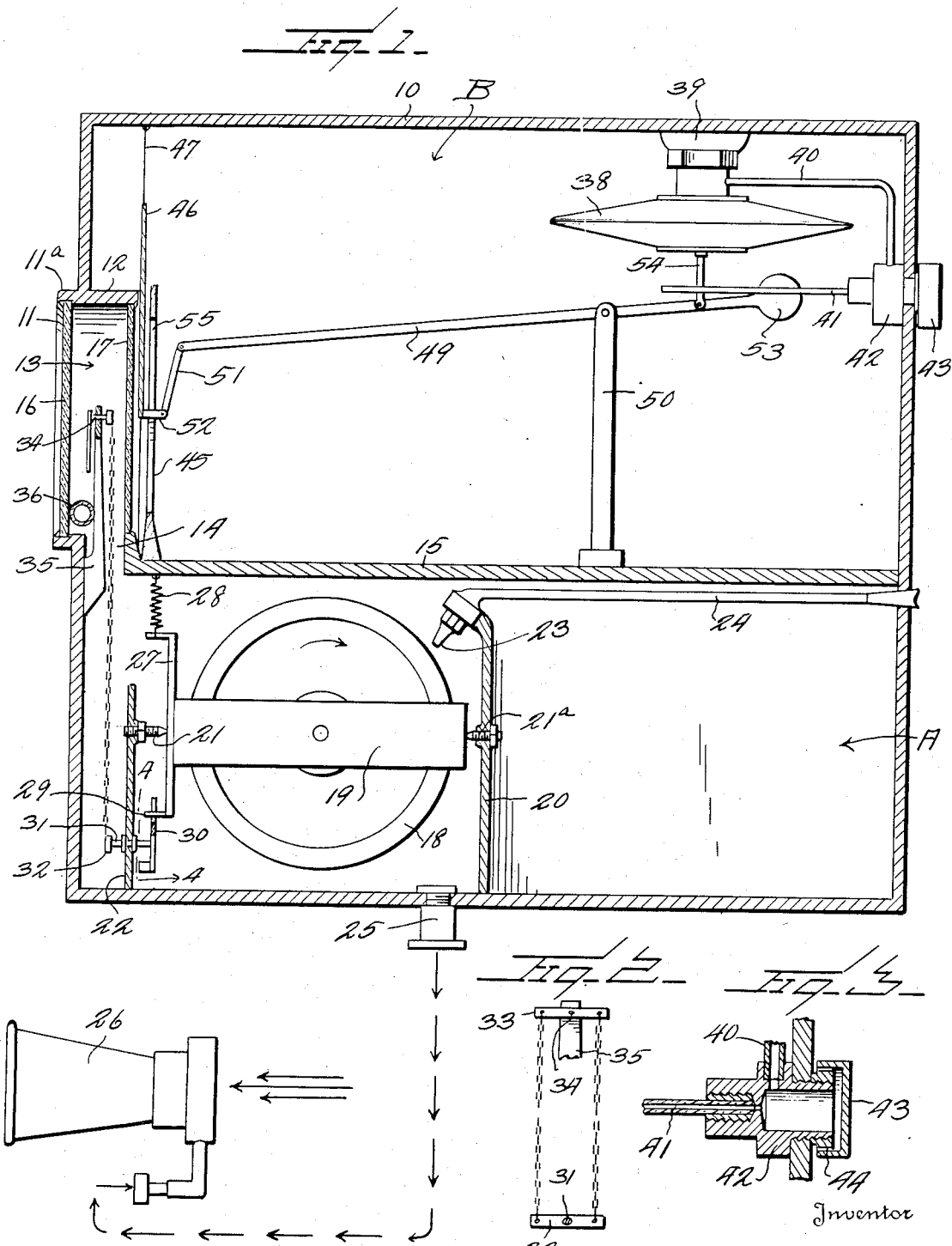

UNITED STATES PATENT OFFICE 2,077,267

FLIGHT INDICATOR FOR AIRCRAFT

Elmer J. Rogers, Jr., United States Army, Honolulu, Hawaii

Application October 1, 1935, Serial No. 43,103

8 Claims. (Cl. 33—204)

This invention relates to means for indicating turn and climb for flying machines and particularly relates to certain improvements on the construction illustrated in my prior application which eventuated in Patent No. 2,041,151, granted May 19, 1936, on Flight meters, as to which application this present application is a continuation in part.

In "blind" flying the pilot of the airplane secures his information with regard to turns and banks from a gyroscopic bank and turn indicator and secures his information as to the rate of climb by a rate of climb indicator which operates ordinarily under differential pressure. Ordinarily associated with the turn indicator is a bank indicator. There are a great many other instruments which the pilot must constantly read and it is desirable, therefore, to reduce the number of these instruments as much as possible and thus reduce the amount of interpretation required in "blind" flying.

The general object, therefore, of the mechanism illustrated in the present application and of the mechanism illustrated in my prior application, is to provide a single instrument whereby the pilot can see and note the degree of bank, his rate of climb and the amount of slip or skid, should they occur, when his plane of reference is obscured or is entirely lacking as in the case of what is known as "blind" flying.

A further object is to provide the pilot with a picture, as it were, more nearly resembling that which he sees under normal flying conditions, thus making the pilot's reactions when flying "blind" less mechanical and giving him more confidence in himself, and to provide an instrument which will enable the pilot to read the instrument with the least possible concentration, thus reducing fatigue, this fatigue being due to the number of instruments which he must ordinarily read and which he must coordinate and interpret and being further due to the necessity of inhibiting his sensations in order to properly read the instruments and because the movement of indicating needles does not supply him with accurate visualization of the actual condition of affairs.

A further object of both the present invention and of my prior invention upon which this present invention is an improvement is to provide an instrument which will allow the pilot a complete range of maneuverability, which will enable the pilot to obtain all the stimuli necessary, from a single dial, to control the flight of the airplane when flying "blind" and further to provide an instrument which will speed up the pilot's reactions when flying "blind" and thus lessen the possibility of the pilot's losing control of the airplane during the time between the receipt of the sensations and his reaction and adjustment to the changed conditions.

In my prior application I showed a construction wherein an airplane figure was tilted to one side or the other in banking by means of a gyroscope contained within a casing. In this structure a shaft passed through the rear wall of the gyroscope casing, this shaft being connected to the shaft of the airplane figure by means of a chain. This construction, however, was found in practice to be impractical in that it was extremely difficult to seal the bearing through which the shaft passed so as to in turn seal the casing within which the gyroscope is disposed and prevent the leakage of air around said bearing.

One object of my present invention, therefore, is to provide means whereby the airplane figure, the gyroscope and the transmission mechanism are all disposed within a sealed compartment so that there is no leakage of air.

In my prior application there was also disclosed an indicator for showing the rate of ascent and descent of the ship which included an arcuate plate movable around a center and having thereon a horizon indication and indications showing the rate of climb or descent, this plate being operated by means of a rack in turn shifted by a hollow capsule or diaphragm contained within a casing, the capsule being connected so that the exterior air may freely enter the capsule and the interior of the casing having a very much smaller opening to the exterior air, the construction acting by reason of the pressure differential between the pressure in the interior of the casing and the pressure within the capsule. The construction further involved a link passing through the casing enclosing the capsule or diaphragm and connected to a lever in turn connected to said rack. Here again it was impractical to prevent the leakage of air from the interior of the casing through the opening through which the link passed, and a further object of the present invention is to obviate this objection by enclosing all the working parts of the rate of climb indicator within a sealed single compartment so that leakage is eliminated.

Other objects will appear in the course of the following description.

My invention is illustrated in the accompanying drawings wherein:

Figure 1 is a vertical section through a flight meter constructed in accordance with my invention;

Figure 2 is a face view of the means whereby power is transmitted from the gyroscopically operated shaft to the figure of the airplane;

Figure 3 is a fragmentary section through the upper casing showing the means whereby air is admitted to the interior of the capsule and to the interior of the compartment wherein the capsule or diaphragm is disposed;

Figure 4 is a fragmentary section on the line 4—4 of Figure 1;

Figure 5 is a front elevation of the movable section or sheet of the rate of climb indicator;

Figure 6 is a fragmentary front elevation of the instrument casing showing the observation opening, the airplane figure mounted therein and the rate of climb indicator disposed behind the airplane figure.

Figures 7 and 8 are elevations of the same character as Figure 6, but showing different positions of the rate of climb indicator.

Referring more particularly to Figure 1, 10 designates an outer casing which may be of any suitable material and which is provided with a circular observation opening 11 confronting the pilot. The wall 10 is extended inward, as at 12, to define a compartment 13 which is open at its bottom, as at 14. Extending longitudinally of the casing 10 is a partition wall 15 having airtight engagement with the rear portion of the wall 10 and extending rearward to a point beneath the forward end of the wall 12. The forward observation opening is closed by means of a pane of transparent material 16 and the rear of the compartment 13 is closed by means of a pane of transparent material 17. It will thus be seen that the panes 16 and 17 and the partition wall 15 divide the interior of the casing into two compartments A and B, the compartment previously referred to as 13 opening into the compartment A and forming part thereof.

Disposed within the compartment A is a gyroscope 18. This is pivotally mounted in a yoke 19 extending fore and aft, this yoke at its forward end being pivotally supported in any suitable bearing 21ª upon a vertical wall 20. The forward end of the yoke 19 is pivotally supported by means of the bearing 21 carried by a vertical bracket 22, of course rigidly mounted within the casing 10. The bearings are adjustable as usual. It will thus be seen that the gyroscope can rotate in the direction of the arrow in Figure 1 and that it can turn around the bearings 21 and 21ª. The gyroscope 18 is constantly driven by a jet of air projected from a jet nozzle 23 against the periphery of the wheel 18. This nozzle is connected by a tube 24 to the exterior of the casing 10 and as the machine moves forward, atmospheric air flows into this pipe 24 and is projected against the gyroscope. From the compartment A and just below the gyroscope 18 leads an air outlet pipe 25 which in turn leads to a Venturi tube 26 mounted on one of the wings of the plane or in any other suitable position so that the passage of air through the Venturi tube in the direction of the arrow in Figure 1 will cause air to be sucked through the tube 24 out through the compartment A and thus project a jet of air against the gyroscope.

Mounted upon the yoke 19 and rotating therewith is a cross bar 27, the upper end of which is connected to a spring 28 which tends to maintain the bar 27 in vertical position. The lower end of this bar 27, as shown in Figure 4, carries a pin 29 which projects into the fork of a lever 30 which is carried upon a shaft 31 mounted in bearings in the bracket 22. This shaft, as shown in Figure 2, carries a cross bar 32 from which chains or other connections extend to a cross bar 33 mounted upon a shaft 34 supported in bearings in a bracket 35. This shaft 34 supports the airplane figure shown in Figures 6, 7 and 8 as fully described and illustrated in my prior application. It will thus be seen that as the gyroscope processes in one direction or the other, the airplane figure will tilt in one direction or the other, such a tilt of the airplane figure being shown in Figure 6. So long as the ship is on an even keel, the airplane figure will be maintained on an even keel as illustrated in Figures 7 and 8, but when the ship banks, the airplane figure will tilt in exact accordance with the tilting of the airplane itself and thus by reference to the horizon line behind the airplane figure, the pilot is given a visual indication of the degree of tilting or the bank made by the airplane itself as fully disclosed in my prior application. Disposed in the lower portion of the opening 11 and behind the pane 16 is an arcuate tube 36 of glass wherein is disposed a metallic ball 37. A damping liquid is disposed within the tube 36 for the purpose of damping the movement of the ball from one side to the other. The ball ordinarily rests at the middle of the tube when the airplane is in straight and level flight. The position of this ball is controlled by the action of the airplane rudder and its position will indicate to the pilot whether or not his application of rudder, in making the turn, was correct, insufficient, or excessive in amount. The coaction of this ball with the airplane figure is fully described in my pending application before referred to and forms no part of the present invention.

In order to provide means whereby the pilot may see the rate at which the airplane is climbing or descending, I provide a rate of climb or descent indicator which is disposed entirely within the compartment B and sealed therein. This includes the hollow diaphragm or capsule 38 mounted upon a supporting bracket 39 depending from the upper wall of the casing 10. The capsule 38 is expansible when the pressure of air within the capsule is greater than the pressure of air within the compartment B and is contractible when the pressure of air within the compartment B is greater than the pressure within the capsule 38. To this end, the capsule is connected by a relatively large pipe 40 to the exterior air in the manner shown in Figure 3, and the interior of the compartment B is connected to the exterior air by means of a tube 41 having a bore much smaller than the bore of the pipe or tube 40. As illustrated in Figures 1 and 3, the pipes 40 and 41 communicate with a hollow head 42 which is screw threaded through the wall of the casing 10. Over the outer end of this hollow head is disposed a cap 43 which has openings 44 leading to the outside air.

For the purpose of visually indicating to the aviator the rate of rise or the rate of descent of his airplane and indicating also that the plane or ship is neither rising nor falling, I provide a fixed screen designated 45 which extends upward from the wall 15 nearly to the upper wall 12 of the sight opening and which is disposed entirely within the compartment B. This screen 45 preferably has its face blackened or otherwise formed to indicate the ground. Coacting with this fixed screen 45 is a movable sky screen 46 shown in Figure 5, which may be made of any suitable sheet material and which is guided at its lateral edges by means of vertical wires or rods 47. The lower edge 46a of this screen constitutes a horizon line. When the screen is lowered, it obscures the upper portion of the ground screen 45 and shows that the machine is rising, as illustrated in Figure 7. When the movable screen 46 rises, however, it discloses more of the ground screen 45 and thus shows that the machine is being lowered. When the machine is flying at a constant level, the parts are as illustrated in Figure 6 where the horizon line 47 is disposed in coincidence with the indices or pointers 48 formed upon the marginal wall 11a of the sight opening 11.

For the purpose of shifting the movable screen 46, I provide a lever 49, as shown in Figure 1, mounted upon a supporting bracket 50, the rear end of this lever being connected by a link 51 and a link 52 to the lower edge of the screen 46, the forward end of the lever being provided with a weight 53. Between the weight 53 and the fulcrum bracket 50 there is a link 54 which connects the bottom of the capsule or expansible diaphragm 38 with the lever 49. It will be obvious now that as the capsule 38 expands the forward end of the lever will be forced downward, the rear end of the lever will rise and the movable screen 46 will rise thus disclosing more of the ground screen 45 showing that the machine is descending. If, on the other hand, the capsule contracts, due to the machine rising and the differential pressure within the compartment B, the sky screen 46 will be lowered reducing the observable area of the ground screen 45, thus showing, as illustrated in Figure 7, that the machine is rising. The ground screen 45 is provided with a vertical slot 55 through which the link 52 extends, as shown in Figures 1 and 8. Disposed along one or both sides of the movable screen 46 are a series of numerals illustrated as running from 200 to 2,000 showing the rate of climb. In Figure 6 where the airplane is moving on a horizontal course, the horizon line 47 is coincident with the pointers 48. In Figure 7 the sky screen 46 has moved downward and the pointers indicate that the rate of climb is 400 feet a minute. The upper portion of the ground screen is also provided with a series of numerals, as shown in Figure 8, showing rate of descent as, for instance, 600 feet a minute; 400 feet a minute; 200 feet a minute, and these numerals are exposed as shown in Figure 8, when the sky screen moves upward and a greater portion of the ground screen is disclosed. It is to be understood that this is not a pitch indicator but purely and solely a rate of climb indicator. The plane may tilt forward or rearward and no indication would necessarily be given of this pitch but the rate of descent or the rate of climb will be indicated. The machine may be 200 feet from the ground or 2,000 feet and if it is maintaining a horizontal flight, the screens will be in the position shown in Figure 6. It is thus not an altitude indicator but purely a rate of climb indicator. The machine may climb to any desired height and then level off and the parts will return to the position shown in Figure 6. The machine may spiral in climbing and the rate of climb indicator will show at what rate the machine is climbing or vice versa, and at what rate the machine is descending whether the machine is spiralling or not.

Of course, the operation of the capsule 38 will be obvious to those conversant with this art. The interior of the compartment B is filled with air at atmospheric pressure passing through the equalizing or bleed tube 41. The capsule is also filled with atmospheric pressure. Now if the machine rises, the pressure within the capsule changes rapidly in accordance with the density of the air but the air within the compartment B cannot change rapidly, thus, if the machine rises and the air becomes rarer, then the air within the capsule is less in pressure than the air within the compartment B which can only slowly equalize and hence the capsule will be compressed, thus shifting the sky screen downward. When the machine comes to a level position, neither rising nor descending, then the air within the compartment B will equalize with the air within the capsule and the capsule will return to its normal position, bringing the horizon line 47 level with the pointers 48. If the machine is descending, the air within the capsule will gradually become more dense. There will be greater pressure in the capsule than in the compartment B and the capsule will expand, raising the sky screen, as shown in Figure 8, until the machine levels off, whereupon the pressure within the compartment B will be equalized with the pressure within the capsule and the parts will return to normal position, that is, the position shown in Figure 6.

It is to be particularly noted that the capsule, the lever, the fixed screen and the movable screen are all disposed within a sealed compartment B and that there is no chance for leakage of air from this compartment B as there was in the construction shown in my prior application. The air within this compartment B can, therefore, only vary in accordance with variations in pressure of the exterior air passing through the equalizing or bleed pipe 41. The same is true of compartment A. There can be no leakage of air from this compartment except that permitted by the discharge pipe 25 leading to the Venturi tube 26. In my prior application, there was leakage of air through the opening which had to be made for the shaft which tilted the miniature airplane. This leakage of air from two points rendered the construction in my prior application impractical as was found when tests were made of this mechanism both at Randolph Field, Texas, and Luke Field, Hawaii.

It is reiterated that the rate of climb indicator does not in any way indicate the pitch or attitude of the plane, thus, for instance, in flying toward a mountain range and with the wind, the plane would encounter a rising current of air caused by the wind striking the upwardly sloping ground and being deflected upwards. This fact would be immediately indicated by the rate of climb indicator and, for instance, it might show a gain in altitude of 400 feet a minute without the attitude of the airplane being changed in any manner and without any instrument furnishing the pilot with pitch indications having deviated from the zero reading. Immediately after passing through a gap in such a mountain wall, a strong descending current of air would be encountered, the air flowing over the obstruction of the mountain range and down on the lee side. The flight meter would immediately indicate a loss of altitude of as, for instance, 600 feet a minute but without the attitude of the airplane changing in any way. The flight meter, under these circumstances, would indicate a maximum change corresponding to the actual performance of the airplane of a thousand feet a minute (400 feet up and 600 feet down) while the pitch indicator on the ship would show that the airplane had not deviated from its level position in flight. It may be stated that in actual tests made by me in Hawaii, the readings of the artificial horizon element corresponded absolutely with the indications of a standard rate of climb indicator which was installed in the airplane for comparison during the tests.

As a further illustration of the difference between the action of my rise and fall indicator and an instrument which would indicate pitch in flight, we will suppose that a transport airplane takes off with twelve passengers, their baggage, mail and a full load of gasoline. Assume further that the airplane landed thirty minutes later and took to the air with only one passenger, no baggage and no mail. While carrying the heavy load, it would have been necessary for the pilot to fly with the nose of the airplane slightly above the horizon (high angle of attack) in order to maintain level flight. On the other hand, while flying light, it would be necessary for the pilot to fly with the nose of the airplane slightly below the horizon (low angle of attack) in order to maintain level flight. An instrument which indicates pitch in flight would, in the first instance, tell the pilot he was climbing when, as a matter of fact, he was actually maintaining level flight, and in the second instance, would tell the pilot he was diving when he was actually maintaining level flight. Under these conditions, therefore, my flight meter which is entirely independent of the attitude of the airplane and which responds only to the changes in its performance, would indicate level flight during the level flight of the airplane, whether the airplane was carrying a heavy load or was only lightly loaded.

While I have illustrated certain details of construction as regards the means for preventing any leakage from the compartments A and B and as regards the details of structure of the rate of descent or rise indicator, I do not wish to be limited to these details except as defined in the appended claims.

It is pointed out that in any structure of this character it is absolutely necessary that the chamber B must be absolutely air-tight with the exception of the capillary leak tube or bleed tube since the contraction and expansion of the pressure sensitive diaphragm depends entirely for its movement on the difference in pressure of the air within the diaphragm and the air within the chamber B. The same is true of chamber A which should be air-tight except for the air inlet nozzle for the gyroscope and the air eduction nozzle. The peculiar shapes of these two chambers A and B and the use of the two panes of glass to render them air-tight makes it possible to combine two mechanisms which function on two entirely different principles though these two mechanisms appear in the pilot's field of view as one instrument. I have thus shown, therefore, a practical means of combining the airplane figure capable of banking movement and the horizon line which moves upward and downward in the pilot's field of view to indicate rate of climb or descent of the actual airplane. It will be noted that the lower edge of the sky screen provides means which correlate with the airplane figure to show the pilot the extent to which the plane has been banked or tilted and that it is only by combining the rate of climb or descent indicator with a tiltable airplane figure that the pilot is given means which visually indicate clearly and without the necessity of any interpretation, just how the airplane is flying even when the plane is being flown "blind".

Referring now to the means for indicating the rate of descent or the rate of rise, it is pointed out that the difference in pressure between the air within the diaphragm and within the chamber B as the airplane climbs or descends, is extremely small. It, therefore, follows that the force available to move the lever which operates the sky screen is very minute. It is, therefore, desirable to make the size of the sky screen on which the horizon line is carried as small as possible. It is for this reason that I use a fixed screen to indicate the ground instead of using, as in my prior application, a movable element, the lower half of which was painted to represent the ground and the upper half of which was used as a sky indicator, the dividing line between the sky and blind constituting the horizon line. I thus greatly reduce the weight of the parts to be moved and permit, therefore, very slight air pressure variations to operate the rate of rise and rate of descent indicator.

What is claimed is:—

1. A flight meter for airplanes including a casing having a view opening, a transparent pane closing said view opening, a wall dividing the interior of the casing into two compartments, said wall having a portion extending upward behind said pane, a second transparent pane disposed in said dividing wall behind the first-named pane, a tiltable airplane figure disposed in one compartment between the panes, mechanism including a gyroscope disposed entirely within said compartment and operatively connected to the figure to tilt it, a rise and fall indicator disposed behind the second named pane and entirely within the second-named compartment and having a horizon line coacting with the airplane figure to indicate rate of descent or rate of rise of the plane, and means operated by variations in the pressure of the exterior air disposed entirely within the second named compartment for operating said indicator.

2. In a flight meter for airplanes, a casing having a view opening, a transparent pane closing said view opening, a wall dividing the interior of the casing into two compartments, said wall having a portion extending upward behind said pane, a second transparent pane disposed behind the first named pane and in said dividing wall, a tiltable airplane figure disposed in one compartment between the panes, mechanism including a gyroscope disposed entirely within said compartment and operatively connected to the figure to tilt it, an air inlet pipe extending into the first named compartment and discharging against the gyroscope, an outlet tube from said second named compartment and including a discharge Venturi portion, a rise and fall indicator mounted in the second named compartment behind the second named pane and having a horizon line, the indicator with its horizon line being vertically movable with relation to the airplane figure, and means for raising or lowering said indicator and the horizon line including a hollow diaphragm mounted entirely within the second named compartment, a tube connecting the interior of the diaphragm with the outside air, a tube of small bore relative to the first named tube and connecting the interior of the second named compartment with the outside air, and means connected to the diaphragm for operating the rise and fall indicator with its horizon line.

3. In a flight meter for airplanes, a casing having a view opening, a transparent pane closing said view opening, a wall dividing the interior of the casing into two compartments, said wall having a portion extending upward behind said pane, a second transparent pane disposed behind the first named pane in said dividing wall, a tiltable airplane figure disposed in one compartment between the panes, mechanism including a gyroscope disposed entirely within the said compartment and operatively connected to the figure to tilt it, an air inlet pipe extending into the first named compartment and discharging against the gyroscope, an outlet tube from said second named compartment and including a discharge Venturi portion, a rise and fall indicator disposed entirely within the second named compartment and immediately behind the second named pane including a ground indicating screen extending upward from the bottom of the compartment and entirely across the second named pane, a sky screen vertically movable in front of the ground indicating screen, the lower edge of the sky screen constituting a horizon line, and means for vertically shifting the sky screen, said means being operated by variations in atmospheric pressure as the altitude of the craft changes.

4. In a flight meter for airplanes, a casing having a view opening, a transparent pane closing said view opening, a wall dividing the interior of the casing into two compartments, one of said compartments having a portion extending upward behind said pane, a second transparent pane disposed behind the first named pane and in said dividing wall, a tiltable airplane figure disposed between the panes, mechanism including a gyroscope disposed entirely within the first named compartment and operatively connected to the figure to tilt it, an air inlet pipe extending into the first named compartment and discharging against the gyroscope, an outlet tube from said second named compartment and including a discharge Venturi portion, a rise and fall indicator disposed entirely within the second named compartment and immediately behind the second named pane including a ground indicating screen extending upward from the bottom of the compartment and entirely across the second named pane, a sky screen vertically movable in front of the ground indicating screen, the lower edge of the sky screen constituting a horizon line, said means being operated by variations in atmospheric pressure, the view opening having pointers disposed on a line intersecting the airplane figure, the sky screen having thereon a series of numerals indicating rate of rise, the ground screen having thereon a series of numerals indicating rates of descent, and means disposed entirely within the second named compartment and operated by variations in atmospheric pressure for raising or lowering the sky indicating screen.

5. In a flight meter for airplanes, a casing having a view opening, a transparent pane closing said view opening, a wall dividing the interior of the casing into two compartments, one of said compartments having a portion extending upward behind said pane, a second transparent pane disposed behind the first named pane and in said dividing wall, a tiltable airplane figure disposed between the panes, mechanism including a gyroscope disposed entirely within the first named compartment and operatively connected to the figure to tilt it, an air inlet pipe extending into the first named compartment and discharging against the gyroscope, an outlet tube from said second named compartment and including a discharge Venturi portion, a rise and fall indicator disposed entirely within the second named compartment and immediately behind the second named pane including a ground indicating screen extending upward from the bottom of the compartment and entirely across the second named pane, a sky screen vertically movable in front of the ground indicating screen, the lower edge of the sky screen constituting a horizon line, said means being operated by variations in atmospheric pressure, the view opening having pointers disposed on a line intersecting the airplane figure, the sky screen having thereon a series of numerals indicating rate of rise, the ground screen having thereon a series of numerals indicating rate of descent, the means for operating said sky indicating screen including a hollow diaphragm disposed within the second named compartment, a tube connecting the interior of the diaphragm with the outside air, a tube of smaller bore than the first named tube and connecting the interior of the compartment with the outside air, the lever pivotally supported within the second named compartment and having linked connection to one wall of the diaphragm, the lever being counter-weighted at one end and at the other end being operatively connected to the sky screen to vertically move it.

6. In a flight meter for airplanes, a casing having a view opening, a transparent pane closing said view opening, a support mounted behind said pane, an airplane figure tiltably mounted upon said support for lateral tilting movement, a gyroscope including a yoke rotatably mounted upon an axis at right angles to the plane of the airplane figure, the yoke at one end having a cross bar normally extending vertically, a spring urging the cross bar to a vertical position, a shaft mounted below the cross bar and having an arm operatively engaged with the cross bar to be shifted thereby, said shaft at its other end carrying a transversely extending bar, a transversely extending bar mounted upon the airplane figure, means pivotally connecting the outer ends of the bars to each other, an air induction tube opening to the exterior of the casing and having a nozzle discharging against the gyroscope to spin the same, and an air eduction pipe extending from the interior of the casing below said gyroscope and having a Venturi discharge portion.

7. In a flight meter for airplanes, a view opening, a transparent pane closing said view opening, a support behind said pane, an airplane figure tiltably mounted upon said support for lateral tilting movement, gyroscopic means operatively connected to the airplane figure to tilt it when the craft turns, means forming a compartment behind the airplane figure and having a view opening alined with said first opening, a pane closing said compartment and disposed immediately behind the airplane figure and a rise and fall indicator disposed entirely within the said compartment and including a fixed ground indicating screen extending upward behind the second named pane, a sky screen vertically movable in front of the ground indicating screen, the lower edge of the sky screen constituting a horizon line, and means for vertically shifting the sky screen, said means being operated by variations in pressure in said compartment and the outside air as the craft changes altitude.

8. In a flight meter for airplanes, a view opening, a transparent pane closing said view opening, a support behind said pane, an airplane figure tiltably mounted upon said support for lateral tilting movement, gyroscopic means operatively connected to the airplane figure to tilt it when the craft turns, means forming a compartment behind the airplane figure and having a view opening alined with said first opening, a pane closing said compartment and disposed immediately behind the airplane figure and a rise and fall indicator disposed entirely within the said compartment and including a fixed ground indicating screen extending upward behind the second named pane, a sky screen vertically movable in front of the ground indicating screen, the lower edge of the sky screen constituting a horizon line, means for vertically shifting the sky screen, said means being operated by variations in pressure in said compartment and the outside air as the craft changes altitude, the first named view opening having pointers disposed on a normally horizontal line intersecting the airplane figure, the sky screen having thereon a vertical series of numerals coacting with said pointers to indicate rate of rise, the ground screen having thereon a vertical series of numerals indicating rate of descent, the means for operating said sky indicating screen including a hollow diaphragm disposed within the compartment, the interior of the diaphragm being connected with the outside air, the interior of the compartment being connected with the outside air by a capillary bleed tube, and an operative connection between the diaphragm and said sky screen whereby to move the sky screen upward as the diaphragm expands and downward as the diaphragm is compressed by the air within the compartment.

ELMER J. ROGERS, JR.